United States Patent [19]

Yamamura

[11] Patent Number: 5,034,886

[45] Date of Patent: Jul. 23, 1991

[54] COMPUTER SYSTEM FOR REDUCING NUMBER OF DEDICATED REGISTERS USING MEMORY STOCK AND SHARING OF ADDRESS AND GENERAL PURPOSE REGISTERS

[75] Inventor: Kimio Yamamura, Tokyo, Japan

[73] Assignee: Hudson Soft Co. Ltd., Hokkaido, Japan

[21] Appl. No.: 236,997

[22] Filed: Aug. 26, 1988

[30] Foreign Application Priority Data

Sep. 14, 1987 [JP] Japan .................... 62-230672

[51] Int. Cl.$^5$ ............... G06F 13/38; G06F 13/10; G06F 12/06

[52] U.S. Cl. ................... 364/200; 364/247.1; 364/247.2; 364/244.3; 364/252.6; 364/254.3; 364/254.5; 364/259.8; 364/260.2; 364/260.1; 364/933.1; 364/933.2; 364/951; 364/957.1; 364/957.6; 364/965.4

[58] Field of Search ............... 364/200 MS, 900 MS

[56] References Cited

U.S. PATENT DOCUMENTS

| | | | |
|---|---|---|---|
| 4,292,669 | 9/1981 | Wollum et al. | 364/200 |
| 4,383,295 | 5/1983 | Miller et al. | 364/200 |
| 4,511,962 | 4/1985 | Machida et al. | 364/200 |
| 4,797,809 | 1/1989 | Sato et al. | 364/200 |
| 4,797,851 | 1/1989 | Suzuki | 364/900 |
| 4,833,640 | 5/1989 | Baba | 364/900 |

Primary Examiner—Archie E. Williams, Jr.
Assistant Examiner—Ayni Mohamed
Attorney, Agent, or Firm—Lowe, Price, Leblanc and Becker

[57] ABSTRACT

In a central processing unit, there are provided a address register for storing source and destination addresses and a count register for storing a length of a block data transfer. The address and count registers are wholly or partly composed of a wide use register having other functions. Therefore, the number of registers is minimized.

3 Claims, 5 Drawing Sheets

| MNEMONIC CODE | SOURCE ADDRESS | DESTINATION ADDRESS |
|---|---|---|
| TII | POST INCREMENT | POST INCREMENT |
| TIN | POST INCREMENT | FIXED |
| TIA | POST INCREMENT | ① POST INCREMENT / ② POST DECREMENT } ALTERNATION |
| TAI | ① POST INCREMENT / ② POST DECREMENT } ALTERNATION | POST INCREMENT |
| TDD | POST DECREMENT | POST DECREMENT |

COMPUTER SYSTEM FOR REDUCING NUMBER OF DEDICATED REGISTERS USING MEMORY STOCK AND SHARING OF ADDRESS AND GENERAL PURPOSE REGISTERS

FIELD OF THE INVENTION

The invention relates to an apparatus for controlling a transfer of data, and more particularly to an apparatus for controlling a transfer of data in which block of data are transferred to minimize the number of registers.

BACKGROUND apparatus for transferring data
A conventional comprises registers for storing source and destination addresses of a memory, and a register for counting a length of a data block which is transferred between two regions of the memory.

In the apparatus for transferring data, data read from the source address of the memory are transferred to the destination address of the memory, while a length of a data block which was tranferred so far is counted in the counting register. When the length becomes a predetermind length of a data block, a block transfer of data is controlled to be finished.

In the apparatus for transferring data, however, the number of registers is increased because registers for a source address, a destination address and a count of a block length are absolutely required to be provided. Especially, the disadvantage is remarkable in a case where source and destination address, and a length of a data block are designated by registers each being of eight bits.

SUMMARY OF THE INVENTION

Accordingly, it is an object of the invention to provide an apparatus for controlling a transfer of data in which the number of registers is minimized.

According to the invention, an apparatus for controlling a transfer of data comprises wide use register and a control means for controlling register selected from the wide use registers to store source and destination addresses and to count a length of a data block which is transferred from the source address to the destination address.

BRIEF DESCRIPTION OF THE DRAWINGS

The invention will be explained in more detail in conjunction with appended drawings wherein.

DESCRIPTION OF THE PREFERRED EMBODIMENTS

Figure 1:
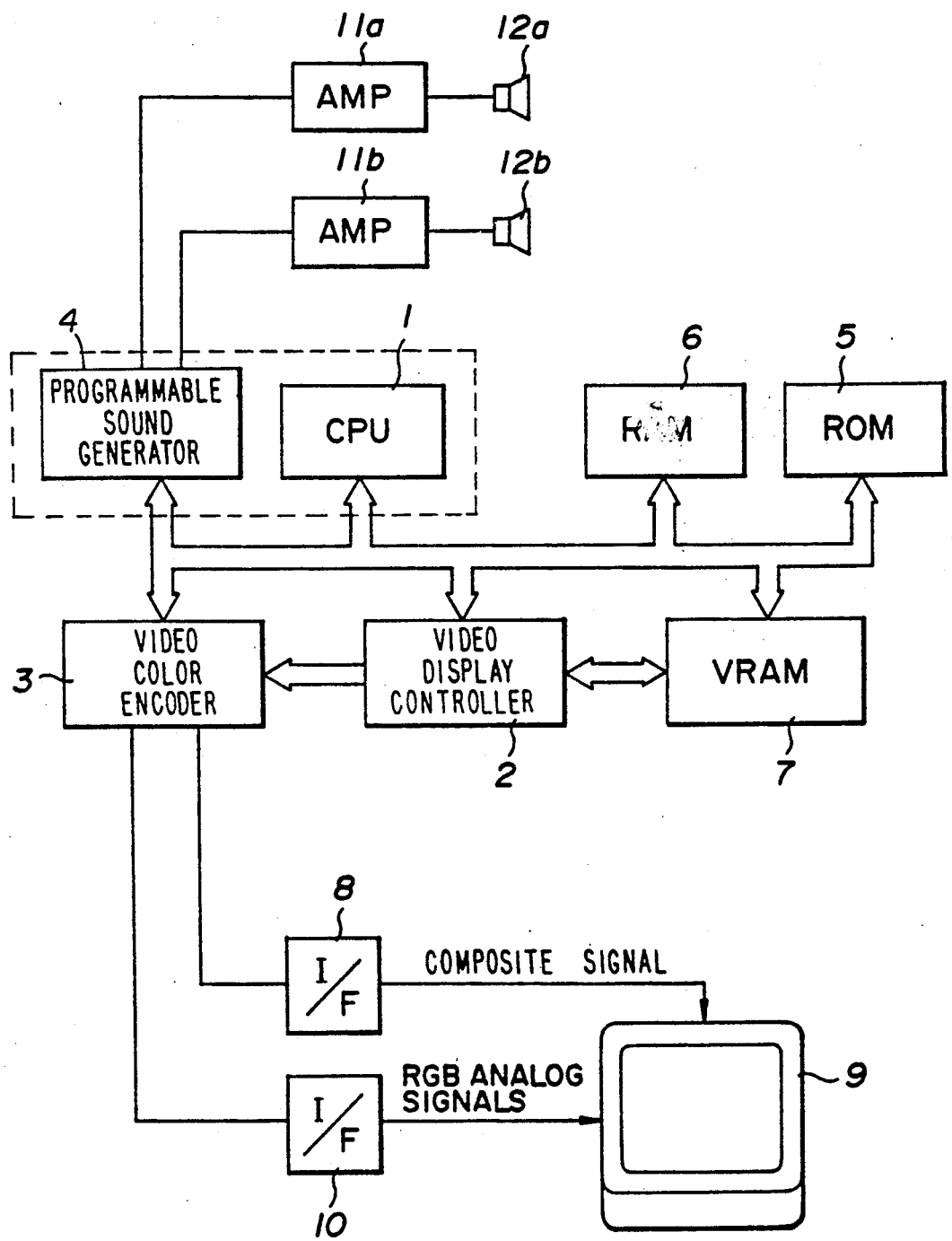
FIG. 1 is a block diagram showing an apparatus for displaying a color image to which an apparatus for controlling a transfer of data in an embodiment according to the invention is applied.

In FIG. 1, there is shown an apparatus for displaying a color image to which an apparatus for controlling a transfer of data according to the invention is applied. In the apparatus for displaying a color image, a CPU 1 performs a predetermined control in accordance with a program stored in ROM 5 so that data, arithmetical results etc. are stored into a RAM 6 temporarily. A video display controller 2 is provided therein to supply a video color encoder 3 with video data of a story, for instance, for a so-called television game read from a video RAM (VRAM) 7 in accordance with a control of the CPU 1 which deciphers a program for the television game stored in the ROM 5. The video color encoder 3 to which the video data are supplied produces RGB analog signals obtained in accordance with color data stored therin, or produces video color signal including a luminance signal and color difference signals obtained in accordance with the color data. Further, a programmable sound generator 4 is provided therein to produce analog sound signals as left and right stereo sounds in accordance with a content of the ROM 5 which is supplied through the CPU 1 thereto. The video color signal produced in the video color encoder 3 is supplied through an interface 8 to a receiving circuit of a television set 9 as a composite signal, and the RGB analog signal is supplied through an interface 10 directly to a CRT of the television set which functions as an exclusive use monitor means. On the other hand, the left nd right analog sound signals are supplied through amplifiers 11a nd 11b to speakers 12a and 12b to produce sounds.

Figure 2:
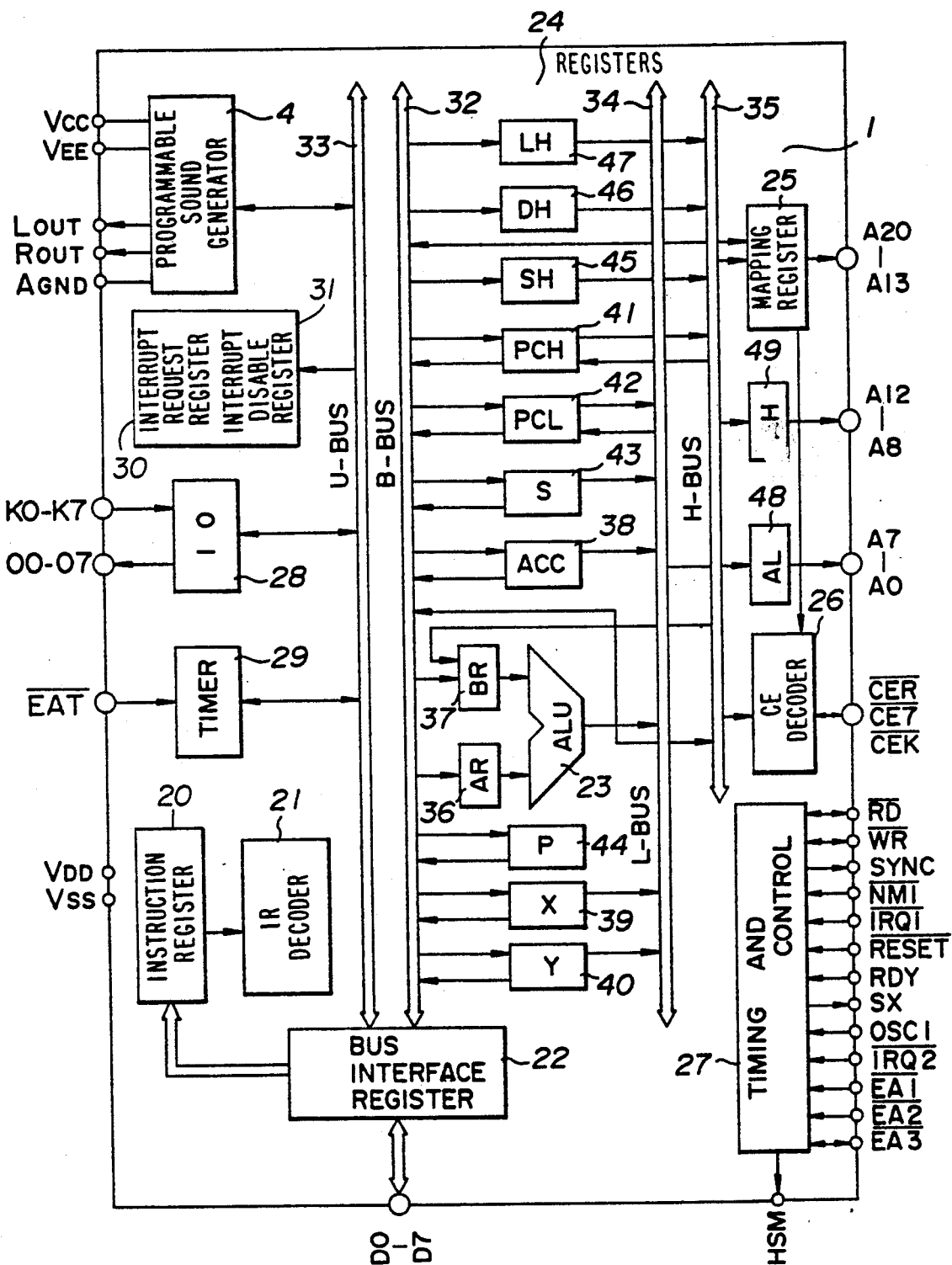
FIG. 2 is a block diagram showing an apparatus for controlling a transfer of data in the embodiment.

FIG. 2 shows the CPU 1 and the programmable sou d generator 4 as encircled by a dotted line in FIG. 1. The CPU 1 in which an apparatus for controlling a transfer of data in the embodiment is included and comprises an instruction registor 20, an instruction decoder 21, a bus interface register 22, an arithmetic and logic unit (ALU) 23, a set of registers 24, a mapping register 25, a chip enable decoder 26, a timing and control unit 27, an input and output port 28, a timer 29, an interrupt request register 30, an interrupt disable register 31, and so on. These units will be explained as follows.

(1) instruction register 20
The register 20 is loaded with an instruction code at an instruction fetch cycle.

(2) instruction decoder 21
The decoder 21 performs a sequential operation determined in accordance with an output of the instruction register 20, an interruption input from a peripheral circuit or a reset input, and further performs a control of a divergence command changing a flow of a program in accordance with informations of a status register described later.

(3) bus interface register 22
The register 22 controls a transfer of data among a B-bus 32, a U-bus 33 and an external bus D0 to D7. The ALU 23 and the set of registers 24 are connected by the B-bus 22, and the U-bus 33 is connected to internal periphery circuits. Further, a L-bus 34 for transferring lower eight bits of a logic address and a H-bus 35 for transferring upper eight bits of the logic address are provided. A logic address low register 48 is connected to the L-bus 34, and a logic address high register 49 is connected to the H-bus 35.

(4) ALU 23 The ALU 23 is provided with an A register 36 and a B register 37, and performs all of arithmetic and logic operation. The A and B registers 36 and 37 are loaded with one or two data so that an arithmetic operation is performed in accordance with a control signal of the instruction decoder 21 to supply one of the B, L and Hbuses 32, 34 and 35 with a result of the arithmetic operation.

(5) set of registers 24

The set of registers 24 comprises following ten registers each being of eight bits.

(a) accumulator 38

The accumulator 38 is a wide use register which plays the most important role in an arithmetic and logic operation to be conducted when a memory arithmetic flag T of a status register described later is "0". Data thereof is supplied to an input of the ALU 23, and a result of the arithmetic is stored therein. The accumulator 38 is also used for a transfer of data between memories and between a memory and a peripheral circuit, and for a count of a data block length when a block transfer of data is performed. A lower data of the length are stored therein after data stored therein at the very moment are evacuated into a stack region of the RAM 6.

(b) X and Y registers 39 and 40

The registers 39 and 40 are wide use registers which are mainly used for an index addressing. The X register 39 is used for a designation of an address on page "0" of a memory which is a destination of an arithmetic operation, and for a storage of lower data of a source address after data stored therein at the very moment are evacuated into a stack region of the RAM 6 when a block transfer of data is performed. On the other hand, the Y register 40 stores lower data of a destination address after data stored therein at the very moment are evacuated into a stack region of the RAM 6 when a block transfer of data is performed.

(c) program counters 41 and 42

An up counter of sixteen bits is composed of the program counter 41 of upper eight bits and the program counter 42 of lower eight bits. The up counter is automatically incremented in accordance with the conduct of a command to designate an address of a command or operand to be next conducted. Contents of the counters 41 and 42 are evacuated into a stack region of the RAM 6 in a case where a command of subroutine is conducted, and an interrupt is produced, or after an interruption command of a software is conducted.

(d) stack pointer 43

The stack pointer 43 designates lower eight bits of the highest address on a stack region of the RAM 6, and is decremented after the pushing of data into the stack region and incremented before the pulling of the data from the stack region. For instance, two hundred fifty-six (256) bytes of addresses "2100" to "21FF" are allocated to the stack region in a logic address.

(e) source high register 45, destination high register 46, and length high register 47

These registers function in case of a command of a block transfer. The source high register 45 provides an upper byte of a source address to designate the source address together with a content of the X register 39. The destination high register 46 provides an upper byte of a destination address to designate the destination address together with a content of the Y register 40. The length high register 47 provides lower eight bits for a down counter together with upper eight bits which are a content of the accumulator 38 so that a length of a block transfer is counted by a byte unit.

(6) mapping register 25

The mapping register 25 is composed of eight registers each being of eight bits to convert a logic address of sixteen bits to a physical address of twenty-one bits, and is selected by upper three bits of the H-bus 35.

(7) chip enable decoder 26

The chip enable decoder 26 provides chip enable outputs for following peripheral circuits by decoding upper eleven bits of a physical address.

(a) a chip enable for the RAM 6...$\overline{CER}$ (b) a chip enable for the video display controller 2...$\overline{CE7}$ (c) a chip enable for the video color encoder 3...$\overline{CEK}$ (d) a chip enable for the programable sound generator 4...$\overline{CEP}$ (e) a chip enable for the timer 29...$\overline{CET}$ (f) a chip enable for the input and output port...$\overline{CE10}$ (g) a chip enable for the interrupt request register 30 and the interrupt disable register 31...$\overline{CECG}$ (8) timing and control unit 27

The unit 27 is connected to the following terminals.

(a) $\overline{RD}$ terminal

A read timing signal is supplied through the $\overline{RD}$ terminal at a reading cycle.

(b) $\overline{WR}$ terminal

A write timing signal is supplied through the $\overline{WR}$ terminal at a writing cycle.

(c) $\overline{SYNC}$ terminal

A synchronous signal of "high" is supplied through the $\overline{SYNC}$ terminal at an instruction fetch cycle, that of "low" is supplied therethrough at a system reset timing.

(d) $\overline{NMI}$ terminal

A non-maskable interruption is produced when $\overline{NMI}$ input signal is supplied through the NMI terminal. A sub-routine call is conducted by reading lower address from the logic address "FFFC" and upper address from the logic address "FFFD" when a command which is conducted in a program is completed.

(e) IRQ1 and IRQ2 terminals

A sub-routine call is conducted by reading lower address from the logic address "FFF8" and upper address from the logic address "FFF9" when IRQ1 input becomes "low" in a case where a corresponding bit in the interrupt disable register 31 is "0", and a corresponding bit in the status register 44 is "0". At this time, the corresponding bit is set in the status register 44, and other corresponding bits are reset therein.

A sub-routine call is conducted by reading lower address from the logic address "FFF6" and upper address from the logic address "FFF7" when IRQ2 input becomes "low" in a case where a corresponding bit in the interrupt disable register 31 is "0", and a corresponding bit in the status register 44 is "0". At this time, the corresponding bit is set in the status register 44, and other corresponding bits are reset therein. (f) $\overline{RESET}$ terminal A program is started by reading lower address from the physical address "001FFE" and upper address from the physical address "001FFF" when a RESET input becomes "low".

(g) RDY terminal

The CPU1 is started to operate when a RDY input is changed from "low" to "high".

(h) SX terminal

A complementary signal of a system clock signal is supplied through the SX terminal.

(i) OSCI terminal

An external clock signal is input through the OSCI terminal.

(j) EA1 to EA3 terminals

These are input terminals for a test of the CPU1.

(k) HSM terminal

A speed mode signal of "high" is supplied through the HSM terminal in case of a high speed mode of 21.47727 MHz/3, and that of "low" is supplied therethrough in case of a low speed mode of 21.47727 MHz/12.

(9) input and output port 28

The port 28 is connected to following terminals.

(a) K0 to K7 terminals

The terminals are input ports from which data are written in accordance with the conduct of a reading cycle in regard to the physical addresses "1FF000" to "1FF3FF".

(b) 00 to 07 terminals

The terminals are output ports with latches to which data are supplied in accordance with the conduct of a writing cycle in regard to the physical addresses "1FF000" to "1FF3FF".

(10) timer 29

The timer 29 is connected to a test input terminal $\overline{EAT}$ for the CPU1 and provides a timer signal through the U-bus thereto.

(11) interrupt request register 30

The register 30 is of eight bits among which five bits are not used, while the remaining two bits are "1" to make the IRQ1 and IRQ2 terminals "low" and the remaining one bit is "1" to produce a timer interrupt signal. The register 30 is only used for "read".

(12) interrupt disable register 31

The register 31 is of eight bits among which five bits are not used, while the remaining two bits are "1" to make an interrupt request of the IRQ1 and IRQ2 terminals disable, and the remaining one is "1" to make an interrupt request disable in accordance with the timer interrupt signal.

Figures 3, 4:
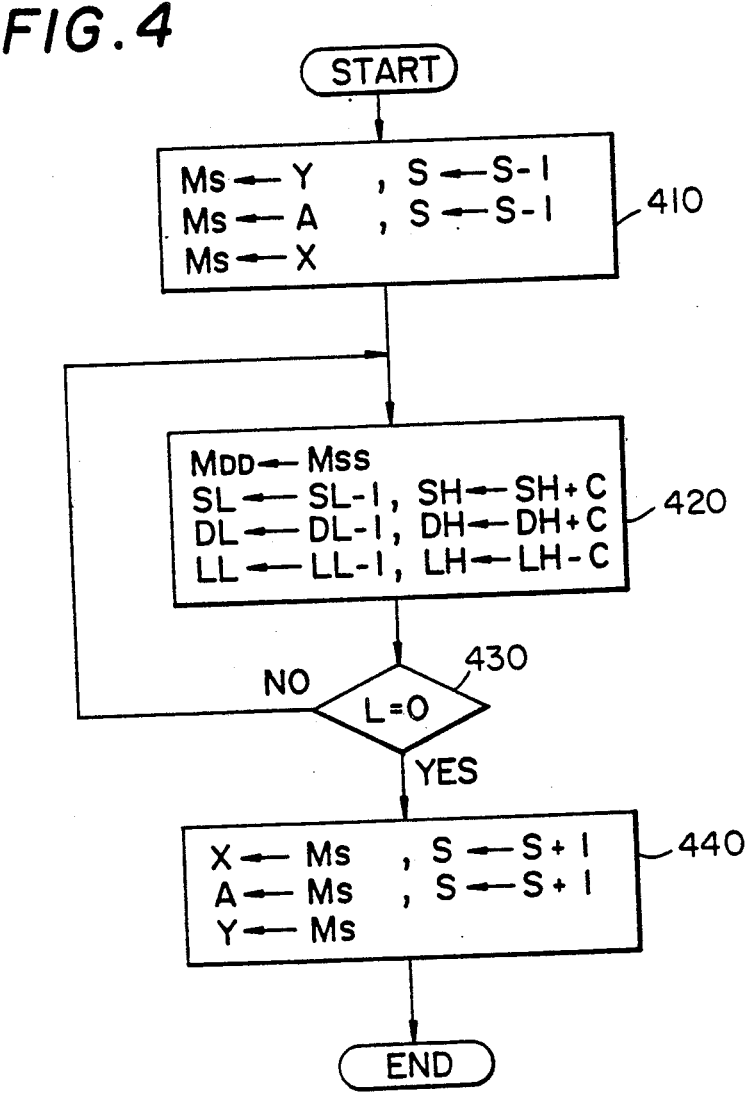
FIG. 3 is an explanatory diagram showing increment and decrement of source and destination addresses in an apparatus for controlling a transfer of data in the embodiment.
FIGS. 4 to 7 are flow charts explaining operation in apparatus for controlling a transfer of data in the embodiment.

In operation, when one of commands TII, TIN, TIA, TAI and TDD for a block transfer of data as shown in FIG. 3 is produced, contents of the accumulator 38, the X register 39 and the Y register 40 are evacuated into a stack region of the RAM 6. Thereafter, the accumulator 38 stores lower data of a length for the block transfer, the X register 39 stores lower data of a source address, and the Y register 40 stores lower data of a destination address. Simultaneously, the source high register 45 stores upper data of the source address, the destination high register 46 stores upper data of the destination address, and the length high register 47 stores upper data of the length for the block transfer. Thus, corresponding registers are loaded with the source address, the destination address, and the block length respectively. At the present stage, the memory arithmetic flag T of the status register 44 is "0". Next, the aforementioned block transfer commands TII, TIN, TIA, TAI and TDD will be explained in conjunction with FIG. 3 to 7.

(1) TII (FIGS. 3 and 4)

In accordance with the command "TII", data are transferred in a block of a predetermined length such that the source and destination addresses are automatically incremented. At first, contents of the accumulator 38, the X register 39, and Y register 40 are evacuated into the stack region $M_S$ as shown in FIG. 4 (block 410) by "$M_S \leftarrow Y$", "$M_S \leftarrow A$" and "$M_S \leftarrow X$", and the stack pointer 43 is decremented after the pushing of data into the stack region $M_S$ as shown in FIG. 4 (block 410) by "$S \leftarrow S-1$". Thus, the block transfer of data is performed from a memory $M_{SS}$ designated by the source high and X registers 45 and 39 to a memory $M_{DD}$ designated by the destination high and Y registers 46 and 40 as shown in FIG. 4 (block 420) by "$M_{DD} \leftarrow M_{SS}$". During this transferring stage, the source and destination addresses are incremented by each transfer of one byte as shown in FIG. 4 (block 420) by "$SL \leftarrow SL+1$", "$SH \leftarrow SH+C$", "$DL \leftarrow DL+1$", "$DH \leftarrow DH+C$". When contents of the length high register 47 and the accumulator 38 for the length counter becomes "0", that is, "L" is "0", in accordance with a down count as shown in FIG.4 (block 430, block 420) by "$LL \leftarrow LL-1$", "$LH \leftarrow LH-C$", the block transfer is completed. At this moment, data which have been evacuated in the stack region $M_S$ are restored in the accumulator 38, the X register 39, and the Y register 40 as shown in FIG. 4 (block 440) by "$X \leftarrow M_S$", "$A \leftarrow M_S$" and "$Y \leftarrow M_S$", and the stack pointer S is incremented as shown in FIG. 4 (block 440) by "$S \leftarrow S+1$".

Figure 5:
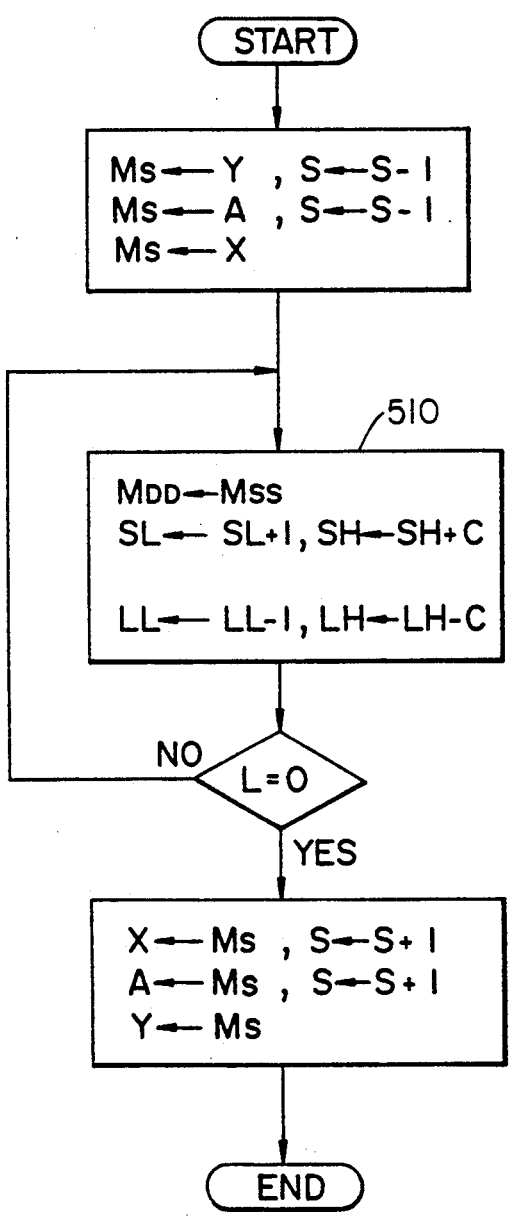

(2) TIN (FIGS. 3 and 5)

Although like operating steps are indicated by like expressions between FIGS. 4 and 5, the difference is that an address of a source memory is incremented by each transfer of one byte, while an address of a destination address is fixed (block 510).

Figure 6:
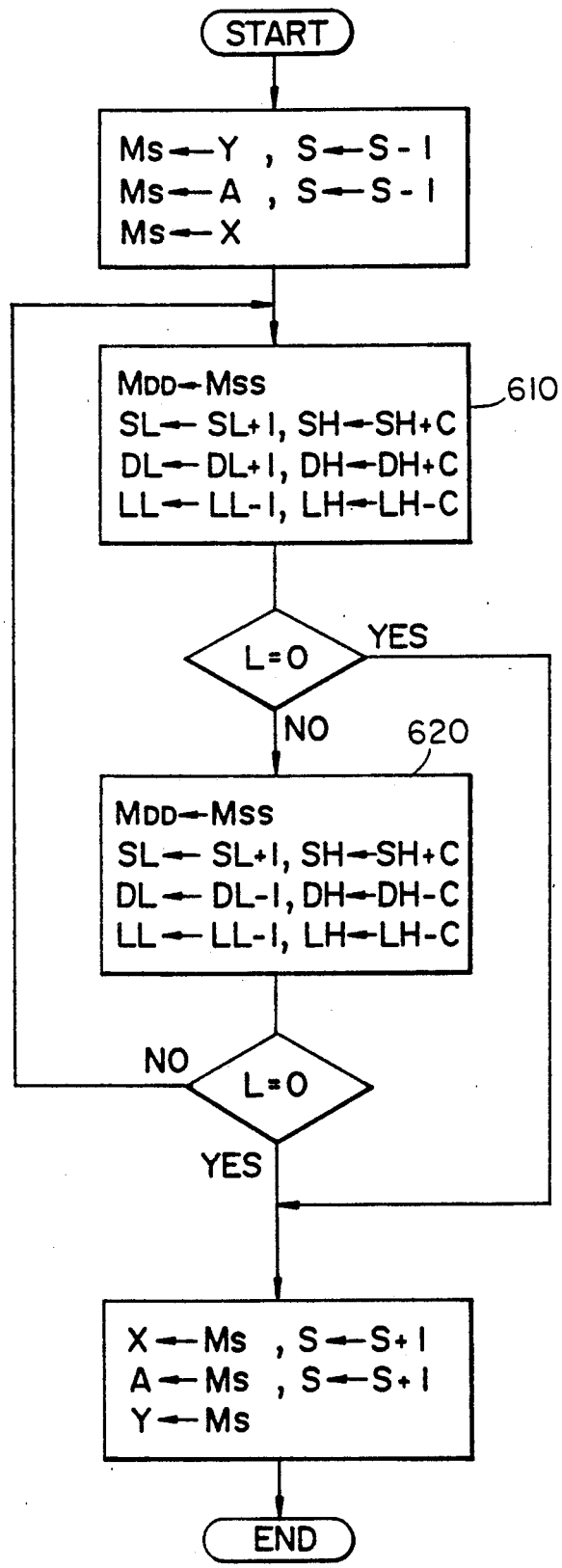

(3) TIA (FIGS. 3 and 6)

Although an address of a source memory is incremented by each transfer of one byte, an address of a destination memory is incremented and decremented alternately by each transfer of one byte (blocks 610 and 620).

(4) TAI (FIG. 3)

Although a flow chart is not shown for the embodiment, an address of a source memory is incremented and decremented alternately by each transfer of one byte, an address of a destination memory is only incremented.

Figure 7:
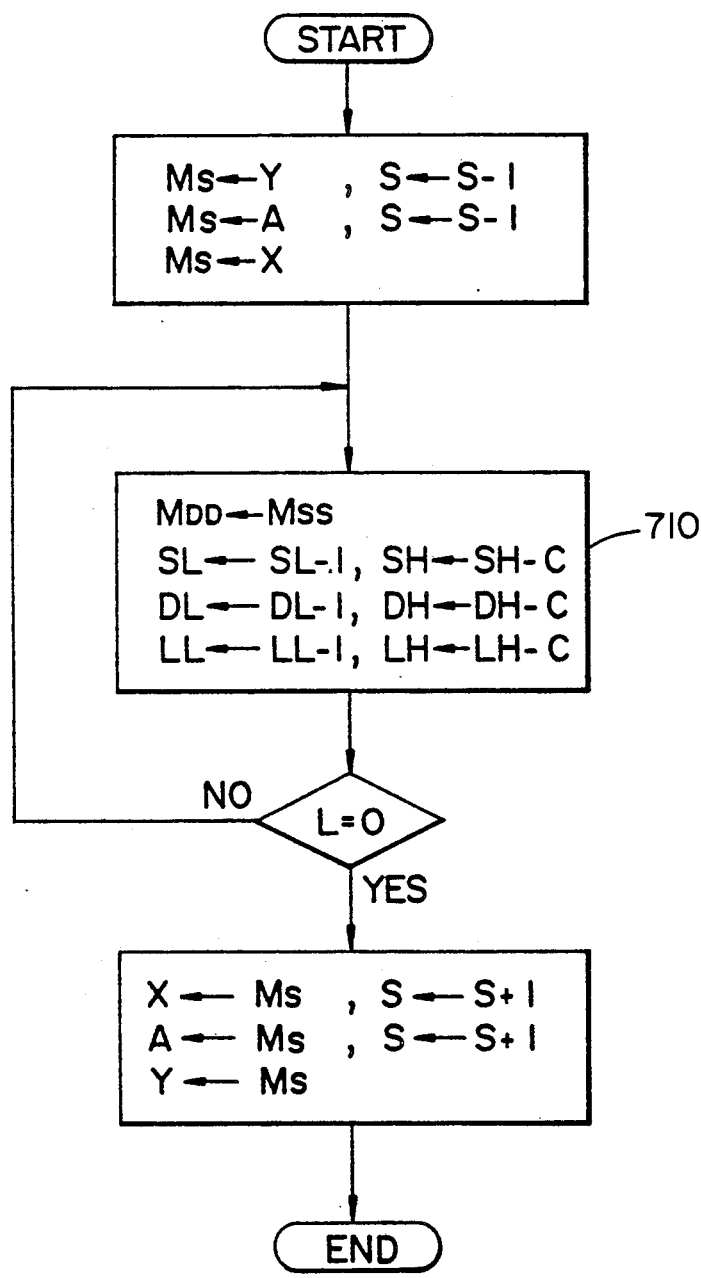

(5) TDD (FIGS. 3 and 7)

Both addresses of a source memory and a destination memory are decremented by each transfer of one byte (block 710).

In the embodiments in which increment and decrement of an address are alternately performed, it becomes easy to set up an interface between the apparatus of the invention and a peripheral integrated circuit.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An apparatus for controlling transfer of data comprising,
   a source address register for storing half the number of bits of a source address of a memory from which said data are read,
   a destination address register for storing half the number of bits of a destination address of a memory into which said data are read,
   a count register for storing half the number of bits of data corresponding to the block length of data which is transferred from said source address to said destination address,
   a central processing unit including first to third registers each storing predetermined data for execution of a programmed process in said central processing unit, said central processing unit further including means for transferring said predetermined data from said first to third registers to a stack region of memory, and storing the remaining number of bits of said source address, destination address and data block length, respectively, in the said first to third registers for performing a block data transfer.

2. An apparatus for controlling transfer of data, according to claim 1, wherein said source address register, said destination address register and said counter register store upper data and said first to third registers store lower data.

3. An apparatus for controlling transfer of data, according to claim 1, wherein said means for transferring said predetermined data comprises status pointer means for designating lower bits of the highest address on said stack region and status register means.

* * * * *